Feb. 25, 1941.  C. W. STUDER  2,232,812

ARMATURE INSULATION AND METHOD OF MOLDING SAME

Filed Oct. 25, 1937   5 Sheets-Sheet 1

INVENTOR
Clair W. Studer
BY
Harry S. Demarse
ATTORNEY

Feb. 25, 1941.    C. W. STUDER    2,232,812
ARMATURE INSULATION AND METHOD OF MOLDING SAME
Filed Oct. 25, 1937    5 Sheets-Sheet 2
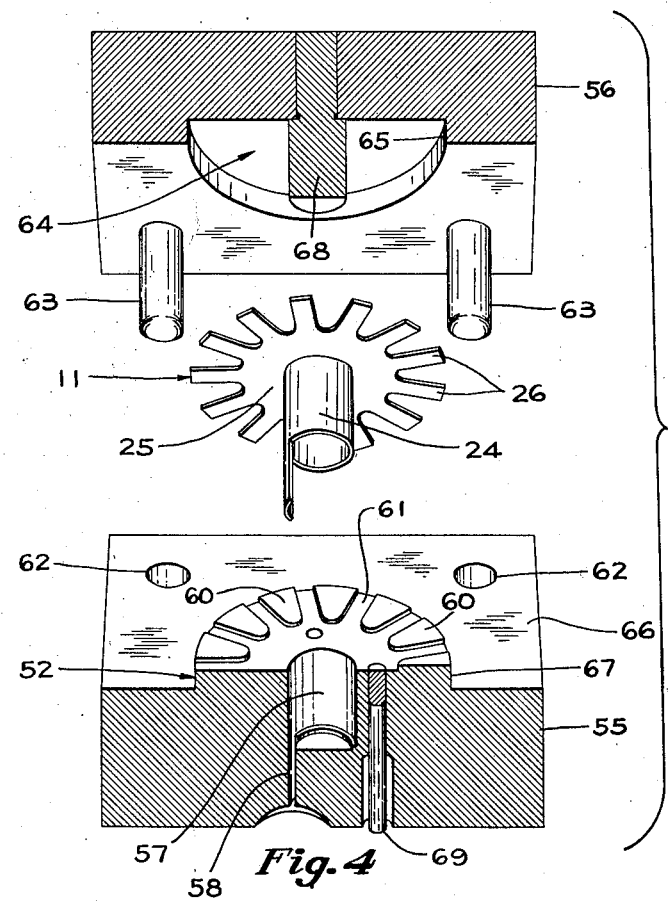
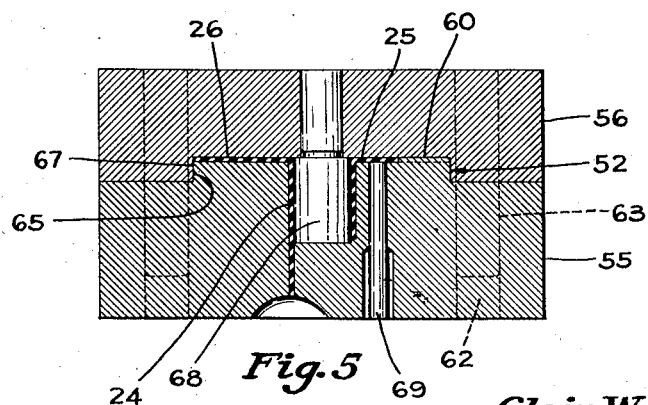
INVENTOR
Clair W. Studer
BY
Harry L. Dumarse
ATTORNEY Feb. 25, 1941.　　C. W. STUDER　　2,232,812
ARMATURE INSULATION AND METHOD OF MOLDING SAME
Filed Oct. 25, 1937　　5 Sheets-Sheet 3
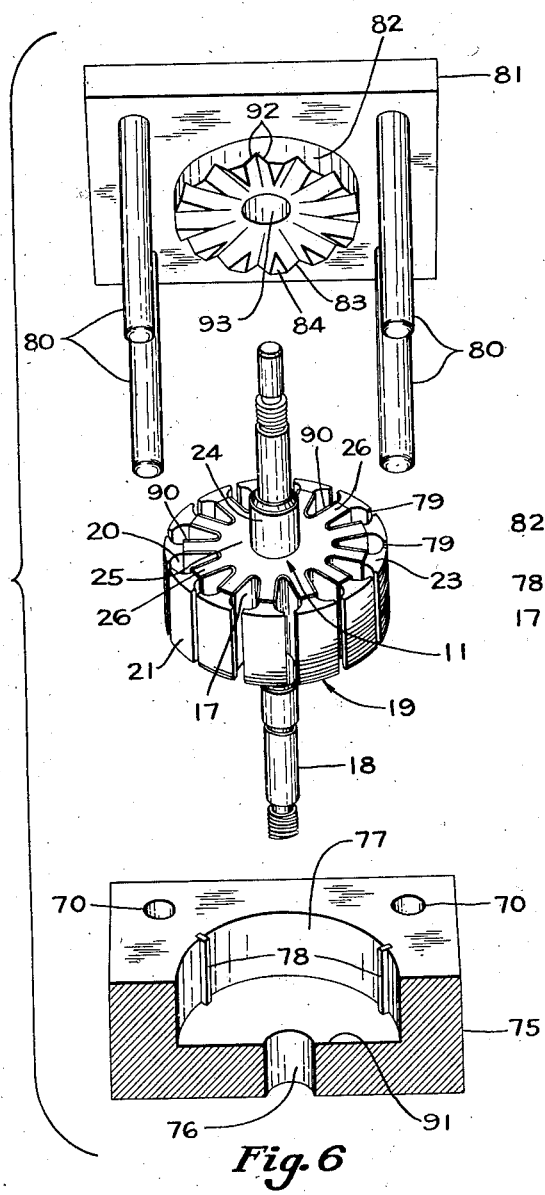
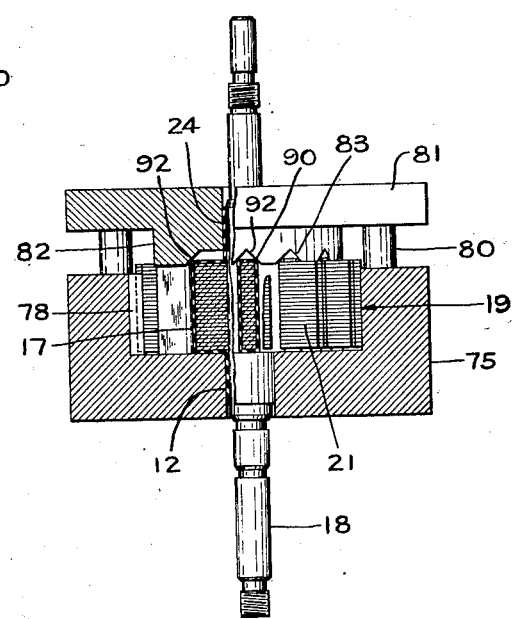
Fig. 7
Fig. 6
INVENTOR
Clair W. Studer
BY
Harry S. Demasse
ATTORNEY

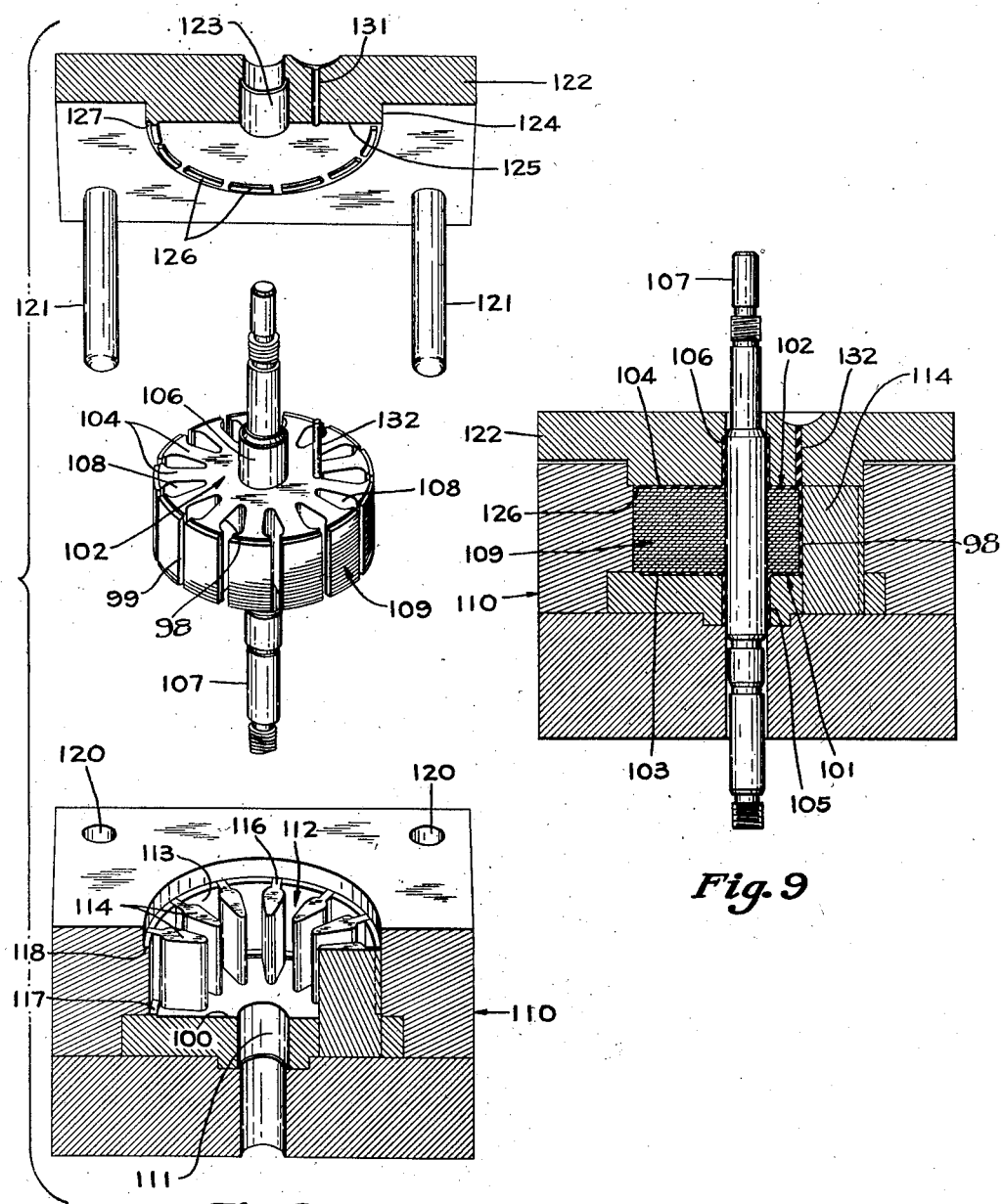

Feb. 25, 1941. C. W. STUDER 2,232,812
ARMATURE INSULATION AND METHOD OF MOLDING SAME
Filed Oct. 25, 1937 5 Sheets-Sheet 5

INVENTOR
*Clair W. Studer*
BY
*Harry S. Dumars*
ATTORNEY

Patented Feb. 25, 1941

2,232,812

UNITED STATES PATENT OFFICE 2,232,812

ARMATURE INSULATION AND METHOD OF MOLDING SAME

Clair W. Studer, North Canton, Ohio, assignor to The Hoover Company, North Canton, Ohio, a corporation of Ohio Application October 25, 1937, Serial No. 170,793

16 Claims. (Cl. 171—206)

This invention relates to armature insulation and to methods and apparatus for molding the same.

An object of the invention is to provide armature insulation having the bushings, end plates and slot liners secured together. A further object is to provide armature insulation completely enclosing the armature stack whereby the windings will not contact the metal laminae. Another object of the invention is to mold armature insulation out of suitable electric insulating molding material, such as cellulose acetate. Another object is to provide a method for molding the armature insulation. A further object is to provide apparatus for carrying out the molding process. Other objects and advantages of the invention will be apparent from the specification and drawings, wherein:

Fig. 4 is a sectional perspective view of another parted mold, for molding the other bushing and end plate forming the other part of the armature insulation;

Fig. 5 is a section through the mold in closed position;

Fig. 6 is a sectional perspective view showing another parted mold for sealing the two molded insulators together to form the completed armature insulation;

Fig. 7 is sectional view of the mold in closed position;

Fig. 8 is a sectional perspective view of another embodiment of the invention, showing a parted mold for molding the slot liners, end plates and bushings as a unit about the armature stack;

Fig. 9 is a section of the molding apparatus in closed position;

Figures 1, 2, 3:
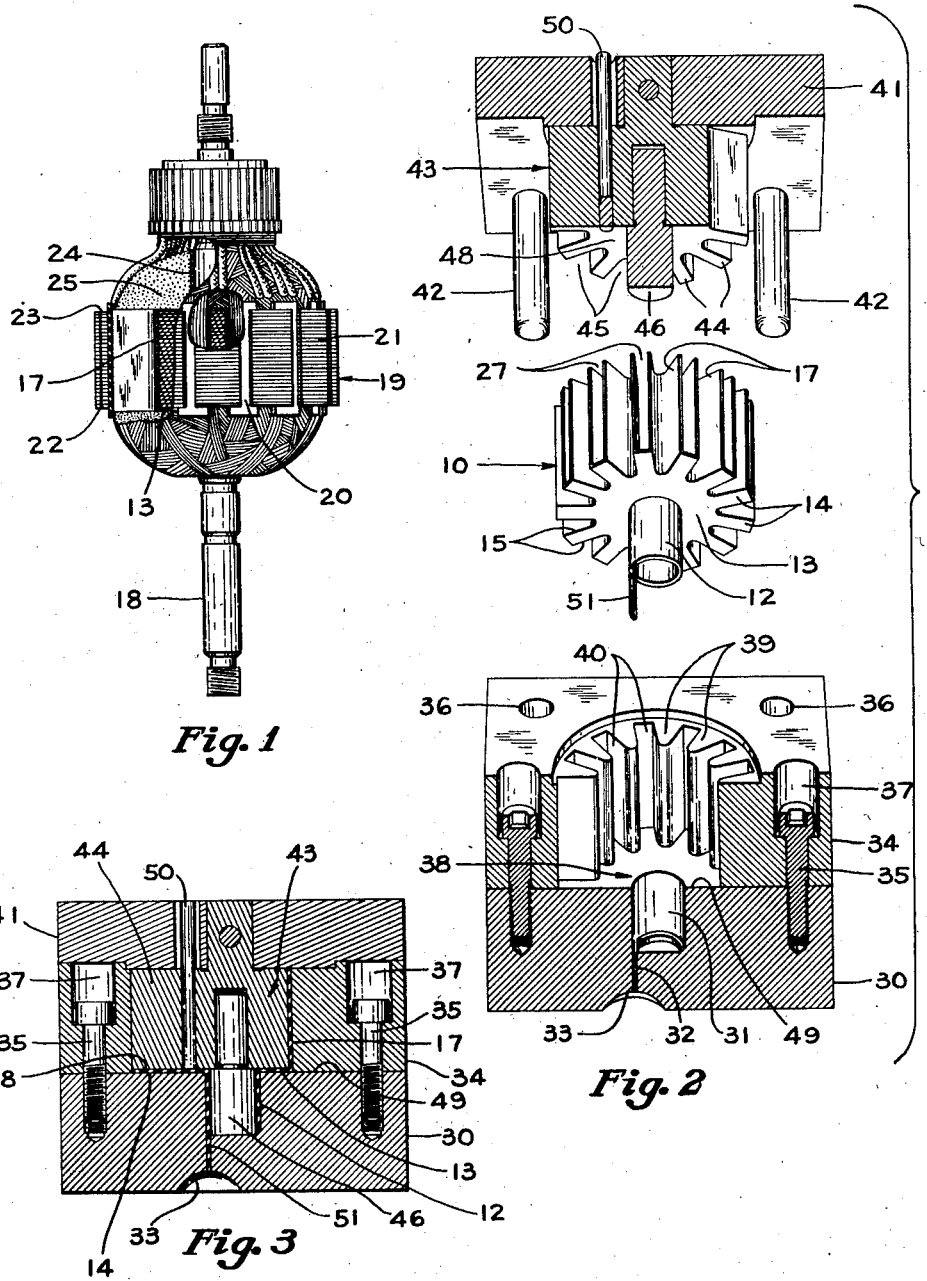
Fig. 1 is an elevational view partly in section of a completed armature.
Fig. 2 is a sectional perspective view of a parted mold for molding a bushing, end plate and slot liners forming part of the armature insulation.
Fig. 3 is a section through the mold in closed position.

One embodiment of the invention is shown in Figures 1 through 7 and comprises an armature insulation molded in two parts, one insulator 10 shown in detail in Fig. 2, and another insulator 11 shown in detail in Fig. 4, the two insulators 10 and 11 being sealed together to provide the armature insulation shown in Fig. 6. The armature insulation may be molded out of a suitable thermo-plastic molding compound, such as cellulose acetate. The molded insulator 10 comprises a bushing 12, a spider or end plate 13 provided with teeth 14 having their marginal edges 15 integral with slot liners 17. The bushings 12 accommodates the armature shaft 18, and the end plate 13 is disposed along the lower outer lamination 22 of the armature stack 19, while the slot liners 17 are disposed in the laminae slots 20 and extend slightly beyond the upper outer lamination 23 of the stack 19. The other insulator 11 comprises a bushing 24, a spider or end plate 25 provided with spaced teeth 26 which are adapted to fit in the openings 27 formed between the adjacent slot liners 17 as clearly shown in Fig. 6.

The apparatus for molding the insulator 10 comprises a base member 30 provided with a cylindrical cavity 31 communicating with an injection port 32 extending to the lower edge of the base 30 and terminating in a depression 33 which is adapted to receive the injecting nozzle for inserting the molding compound into the molding apparatus. Above the base 30 is a molding member 34 adapted to be detachably secured to the base 30 by means of screws 35 disposed in openings 37. Extending through the mold member 34 is a cavity 38 in which are spaced annularly arranged projections 39 tapered inwardly toward the center of the cavity and defining therebetween recesses 40. Adapted to be removably disposed upon the mold member 34 is a top plate 41 provided with a plurality of guide pins 42 for insertion in the openings 36 in the mold member 34. Depending from the molding member 41 is a projection 43 provided with a plurality of spaced annularly arranged teeth 44 which define therebetween slots 45 adapted to receive the projecting teeth 39 in the mold member 34 to form the slot liners 17 of the insulator 10. Depending from the projection 43 is a cylindrical member 46 adapted to be disposed in the cavity 31 in the lower mold member 30 to form the bushing 12.

To carry out the molding process the mold is assembled with the guide pins 42 disposed in the openings 36 to position the member 46 in spaced relation with respect to the cavity 31 to define the bushing 12, and the teeth 44 are disposed in the slots 40 in spaced relation with respect to the teeth 39 to form the molded slot liners 17. When the molding apparatus is properly assembled there will be a vacant space between the lower surface 48 of the projection 43 and the upper surface 49 of the molding member 30 to form the spider 13. The assembled mold is kept at a relatively cool temperature and the thermo-plastic molding compound, such as cellulose acetate, is heated to a suitable temperature and then injected through the port 32 into the mold to form the bushing 12, spider 13 and slot liners 17. During the molding operation the mold is kept relatively cold which causes the molding material to solidify. After the molding compound has solidified, the mold is parted and pressure exerted on the ejector pins 50 to remove the insulator from the upper mold member 41. As a result of the molding process a sprue or gate 51 is formed in the injection port 32 which must be removed from the bushing 12.

The apparatus for molding the insulator 11 comprises a base mold member 55 and a top mold member 56, the former being provided with a cavity 57 communicating at one end with an injection port 58 and at the opposite end terminating in an annular projection 52 extending above the surface 66 of the base member 55. The annular projection 52 is provided with spaced radially extending projections 60 defining therebetween slots 61 which are adapted to form the teeth 26 of the spider 25. The mold member 55 is provided with a plurality of openings 62 for the reception of guide pins 63 depending from the upper member 56, the latter being provided with an annular recess 64 defined by a shoulder 65 which is adapted to snugly engage the periphery 67 of the projection 52 to form the diameter of the spider 25. Depending from the upper mold member 56 is a member 68 which is adapted to be disposed in spaced relation with the wall of the cavity 57 to form the bushing 24.

In molding the insulator 11 the upper mold member 56 is placed upon the lower member 55 with the guide pins 63 in the openings 62 which properly positions the mold members with respect to each other, and thereafter the molding material, which may be a thermo-plastic compound such as cellulose acetate, is injected through the injection port 58 into the chamber 57 and between the cooperating molding members to form the spider 25 and its teeth 26 and the bushing 24. In order to remove the molded insulator from the member 55 pressure is exerted on the ejector pins 69.

The insulators 10 and 11 are then assembled to form a unitary armature insulation. The apparatus for uniting these two insulators is shown in Figures 6 and 7 and comprises a fixture 75 provided with a bore 76 communicating with the cavity 77 adapted to receive the laminae 21 of the armature, and the peripheral wall of the cavity is provided with guide pins 78 which are adapted to be disposed between the narrow slots 79 between the adjacent teeth of the laminae 21 to properly position the latter in the lower fixture 75. Suitable guide openings 70 are provided in the lower fixture 75 to receive the guide pins 80 in the upper fixture 81 which is provided with a depending projection 82 having its lower surface provided with substantially V shaped notches 83 and a plurality of projections 84, the inclined walls 92 of the depressions 83 being adapted to engage the free ends 90 of the slot liners 17 to swedge the latter onto the teeth 26 of the spider 25 to seal the insulators together.

The method of sealing together the insulators 10 and 11 comprises arranging the insulator 10 on the armature shaft 18 with the slot liners 17 disposed in the winding slots 20, the slot liners 17 being of such length as to extend beyond the end lamination 23 of the armature stack, and thereafter sliding the insulator 11 along the armature shaft 18 until the teeth 26 of the insulator 11 are disposed in the openings 27 between the adjacent slot liners 17, as indicated in Fig. 6.

The assembled insulators 10 and 11 and the armature stack 19 and shaft 18 are then placed as a unit in the lower fixture 75 with the bushing 12 in the opening 76, and the spider 13 resting on the bottom 91 of the cavity 77, the guide pins 78 being disposed between the narrow slots 79 formed between the teeth of the laminae to properly position the armature stack in the lower fixture 75. The upper fixture 81 is placed upon the lower fixture 75 with the guide pins 80 in the openings 70 to guide the inclined walls 92 of the V-shaped slots 83 into engagement with the corners 90 of the slot liners 17, and the bushing 24 of the insulator 11 is disposed in the opening 93 of the upper fixture 81. Heat is then applied to the upper fixture or sealing member 81 to heat the inclined walls 92 of the V-shaped notches 83 to swedge the ends 90 of the slot liners 17 to the marginal edges of the spider teeth 26, and thus seal the insulators 10 and 11 together. In order to remove the molded insulated armature from the mold, the upper fixture 81 is slidably removed and thereafter the molded armature is separated from the lower fixture 75.

Another embodiment of the invention is shown in Figures 8 and 9. In this modification the armature insulation is molded in one piece directly onto the armature stack and the shaft. The armature insulation comprises spiders 101 and 102 respectively provided with bushings 105 and 106 arranged about the armature shaft 107 and teeth 103 and 104 molded on the armature stack 109, the slot liners 98 molded in the laminae slots 108.

The apparatus for molding the insulation directly on to the armature includes a lower fixture 110 provided with a bore 111 communicating with a cavity 112, and projecting from the annular wall 113 of the cavity is a plurality of spaced annularly arranged projections 114 provided at their outer ends with a reduced portion 116 adapted to accommodate the narrow slots 99 on the armature stack 109, and the projections 114 are tapered inwardly towards the armature shaft 107 and are substantially complementary to the enlarged laminae slots 108 for registry with the same. Projecting from the bottom wall 100 of the cavity 112 is an annular shoulder 117, and the upper part of the cavity 112 is enlarged to provide another annular shoulder 118 which lies flush with the upper surface of the projections 114. The lower fixture 110 has a plurality of guide openings 120 for the reception of the guide pins 121 in the upper fixture 122 which is provided with a central opening 123 adapted to accommodate the armature shaft 107 and the molded bushing 106, and the opening 123 terminates in an annular depending projection 124 provided with spaced annularly arranged depending arcuate lugs 126 on the surface 125 of the projection 75

124. The depending lugs 126 are adapted to fit between the adjacent reduced portions 116 of the projections 114 of the lower fixture 110, and the margin 127 of the projection 124 rests upon the shoulder 118 of the lower fixture 110.

In order to carry out the molding process, the unwound armature stack 109 and shaft 107 are inserted as a unit in the lower fixture 110 so that the molding cores or projections 114 are disposed in spaced relation in the laminae slots 108 to form the slot liners 98, the lower end of the laminae resting on the annular shoulder 117 to provide a vacant space for molding the spider 101 and the shaft 107 rigidly supported in the reduced portion of the bore 111. The upper fixture 122 is then placed upon the lower fixture 110 with the guide pins 121 in the guide openings 120 to properly position the lugs 126 between the adjacent reduced portions 116 of the projections 114, and the marginal edge 127 of the projection 124 rests upon the shoulder 118.

The molding compound which may be of suitable thermoplastic material, such as cellulose acetate, is then injected through the injection port 131 into the mold about the cores 114 and the armature stack and shaft to mold the insulation directly onto the laminations of the armature. When the molding operation is completed and the cellulose acetate has solidified, the mold is parted and the armature removed. Thereafter the sprue 132 formed during the injection molding process is removed.

From the foregoing it will be perceived that this modification provides an armature insulation that is molded as a unit about the rotor and that the bushings, spiders and slot liners are molded directly onto the armature to provide an insulation which completely encloses the armature stack.

Figure 11:
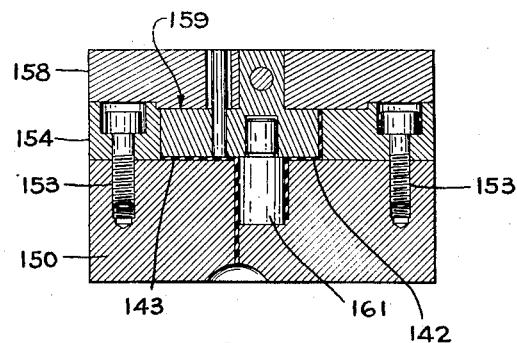
Fig. 11 is a section of the mold in closed position.
Figure 10:
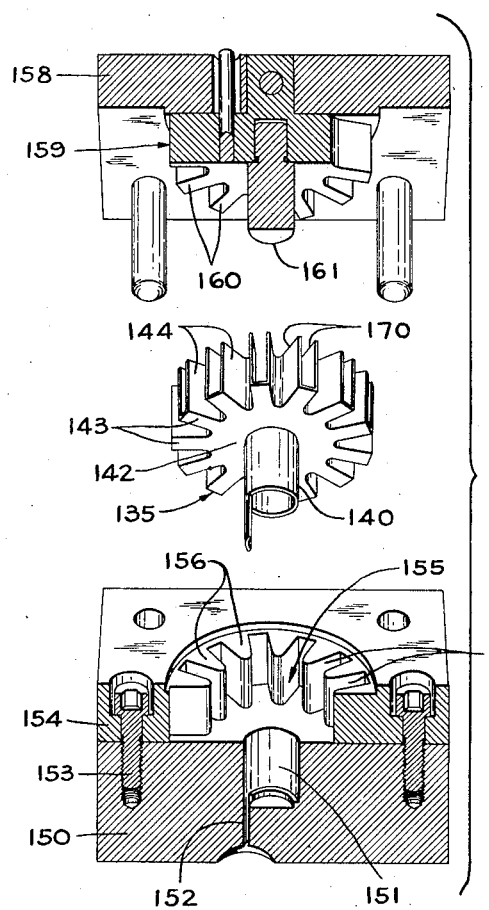
Fig. 10 is a sectional perspective view of another embodiment of the invention, showing a parted mold for molding a bushing, end plates and slot liners forming one-half the completed insulation.
Figure 12:
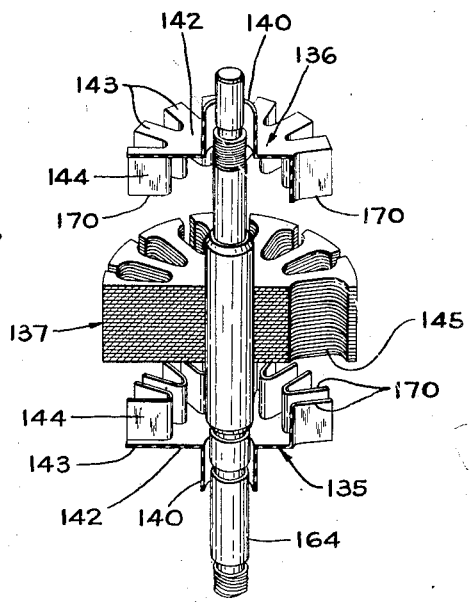
Fig. 12 is a sectional perspective view showing the method of assembling the duplicate molded insulators shown in Fig. 10 about the armature stack to completely insulate the armature.

Another embodiment of the invention is shown in Figures 10 to 12 and comprises armature insulation formed in two duplicate parts 135 and 136, each part having a bushing 140, a spider 142 provided with teeth 143 integrally formed with slot liners 144 which extend only one-half the length of the winding slots 145 in the armature stack 137.

The apparatus for molding the insulators 135 and 136 is similar to that shown in Figures 2 and 3, the only distinction being in the apparatus for forming the slot liners 144 are substantially one-half the length of the laminae slots 145. In this modification the molding apparatus comprises a base 150 provided with a cavity 151 communicating with an injection port 152. Detachably supported in the base 150, by screws 153, is a mold member 154 provided with a cavity 155 in which are spaced annularly arranged projections 156 defining slots 157 substantially one-half the length of the laminae slots 145. An upper mold member 158 is provided with a projection 159 having radially extending teeth 160 adapted to be inserted in the slots 157 to form one-half the length of the slot liners. Depending from the projection 159 is a member 161 for insertion in the cavity 151 to form the bushings 140.

The molding process to mold the insulators 135 and 136 is carried out in the manner described in connection with the first embodiment.

In order to assemble the armature insulators on the armature stack 137 and shaft 164, the molded insulators 135 and 136 are moved along the shaft 164 and the molded slot liners 144 inserted into the laminae slots 145, the free ends 170 of the slot liners 144 meeting substantially midway of the laminae slots 145. If desired, the slot liners 144 may be of such length as to overlap slightly at their points of contact. The armature is then wound, impregnated with varnish and baked. The temperature at which the varnish is baked tends to soften the insulators and the free ends 170 will be sealed together.

I claim:

1. A rotor, comprising a core having a plurality of winding slots and supported on a shaft, and molded insulation lining said core slots and covering the opposite ends of said core and said shaft adjacent said opposite ends, said molded slot liners having openings to receive the winding for said rotor.

2. A rotor, comprising a core having a plurality of winding slots and supported on a shaft, a molded insulator including slot liners lining said winding slots and a spider covering an end of said core and a bushing surrounding said shaft adjacent said spider, and another molded insulator including a spider covering the other end of said core and sealed to said slot liners and a bushing surrounding said shaft adjacent said last mentioned spider.

3. A rotor, comprising a core having a plurality of winding slots, a molded insulator including slot liners and a spider, said slot liners lining said winding slots and said spider covering an end of said core, and a molded insulator including another spider covering the other end of said core and sealed to said slot liners.

4. A rotor, comprising a core having a plurality of winding slots and supported on a shaft, and a single mass of insulation lining said winding slots and extending outwardly therefrom to cover the opposite ends of said core and said shaft adjacent said opposite ends, said molded mass of insulation having openings for receiving the winding for said rotor.

5. A rotor, comprising a core provided with winding slots, and a single mass of insulation molded about said core, lining said winding slots and covering the opposite ends of said core, said molded mass of insulation having openings for receiving the winding for said rotor.

6. A rotor, comprising a core having a plurality of winding slots and supported on a shaft, and a two part insulator, each part including slot liners lining a portion of the length of said winding slots, and a spider covering an end of said core, and a bushing disposed about said shaft adjacent each spider.

7. A rotor, comprising a core provided with winding slots, and a two part insulator each part including slot liners lining a portion of the length of said winding slots, and a spider covering an end of said core.

8. The method of insulating a rotor having a core provided with winding slots, which consists of molding a one piece insulator including a spider and slot liners, molding a separate spider, arranging said insulator about said core with its slot liners lining said winding slots and its spider covering an end of said core, arranging said separate spider about said core covering another end of said core, and sealing said slot liners to said separate spider.

9. The method of insulating a rotor having a core provided with winding slots and supported on a shaft, which consists of molding a one piece insulator including a bushing, spider and slot liners, molding in one piece another insulator including a bushing and spider, arranging the first mentioned insulator on said core the molded slot liners lining said winding slots, the spider covering and end of said core and the bushing disposed about said shaft, arranging said other insulator on said core with its spider covering the other end and its bushing about said shaft, and then sealing said slot liners to the spider of said another insulator.

10. The method of insulating a rotor having a core provided with winding slots, which comprises molding in duplicate a pair of insulators each having a spider and slot liners, said spiders corresponding to the flat contour of the end of said core, and said slot liners corresponding to the contour of said winding slots and substantially one-half the length of said slots, and assembling said insulators on said core with said slot liners lining said core slots and said spiders covering the ends of said core.

11. The method of insulating a rotor having a core provided with winding slots, which comprises forming in duplicate a pair of insulators each having a bushing, a spider and slot liners, said bushings corresponding to the contour of the rotor shaft, said spiders corresponding to the flat contour of the ends of said core, and said slot liners corresponding to the contour of said winding slots and substantially one-half the end of said slots, and assembling said insulators on said core and shaft with said slot liners lining said winding slots, each spider covering an end of said core and said bushings disposed about said rotor shaft.

12. An armature, comprising a core having a plurality of winding slots, pre-molded insulation lining said slots and covering the outer surfaces of the opposite ends of said core, said pre-molded insulation providing open-mouth insulation lined winding slots, and a winding disposed in and wound about said pre-molded insulated slot liners and about said pre-molded insulation covering the outer surfaces of said opposite ends of said core.

13. An unwound rotor, comprising a core having a plurality of slots, molded insulation lining said slots and covering the outer surfaces of the opposite ends of said core, said molded insulation having open winding slots for receiving the winding for said rotor, whereby said rotor may be wound.

14. Insulation for an unwound rotor having a plurality of slots, comprising molded insulation lining said slots and the outer surfaces at the opposite ends of said rotor, said molded insulation having open winding slots for receiving the winding for said rotor, whereby the latter may be wound.

15. An unwound rotor, comprising a core supported on a shaft and having a plurality of slots, and molded insulation lining said slots and covering the outer surfaces of the opposite ends of said rotor and the shaft adjacent said opposite ends of said rotor, said molded insulation having open winding slots for receiving the winding for said rotor, whereby the latter may be wound.

16. In a rotor, a core having a plurality of slots, and molded insulation lining said slots, said molded insulation having open winding slots lining said slots of said rotor for receiving the winding for said rotor, whereby the rotor winding may be inserted in said insulated open winding slots to wind said rotor.

CLAIR W. STUDER.